United States Patent [19]
Keller et al.

[11] Patent Number: 4,569,364
[45] Date of Patent: Feb. 11, 1986

[54] VARIABLE FLOW SELF-CLEANING LIQUID DISTRIBUTION ELEMENT AND LIQUID DISTRIBUTION ASSEMBLY EMPLOYING A PLURALITY OF SUCH ELEMENTS

[75] Inventors: George J. Keller, Laguna Niguel; Takashi Yanagi, Monterey Park, both of Calif.

[73] Assignee: Fractionation Research, Inc., So. Pasadena, Calif.

[21] Appl. No.: 735,663

[22] Filed: May 20, 1985

[51] Int. Cl.⁴ .............................................. B08B 9/04
[52] U.S. Cl. .................................. 137/244; 15/104.16; 137/561 A; 137/561 R; 137/883; 137/599.1; 165/94; 165/95; 202/158; 202/241; 261/97; 261/113; 261/114 R
[58] Field of Search ................. 137/244, 245.5, 561 A, 137/561 R, 599.1, 883; 134/166 C; 15/104.16; 165/94, 95; 202/158, 241; 261/97, 113, 114 R

[56] References Cited
U.S. PATENT DOCUMENTS

| | | | |
|---|---|---|---|
| 1,135,498 | 4/1915 | Carpenter | 137/245.5 |
| 2,538,947 | 1/1951 | Ragatz | 137/244 |
| 2,746,535 | 5/1956 | Barroso | 15/104.16 |
| 2,882,022 | 4/1959 | Greathouse et al. | 165/95 |
| 2,971,897 | 2/1961 | Chapman | 202/241 |
| 3,491,792 | 1/1970 | Eckert | 261/97 |
| 3,524,731 | 8/1970 | Effron et al. | 261/97 |
| 4,382,465 | 5/1983 | Baron et al. | 165/95 |

Primary Examiner—George L. Walton
Attorney, Agent, or Firm—George J. Netter

[57] ABSTRACT

A pan-type liquid distribution assembly or fractionator which regulates the liquid flow through distribution tubes and, at the same time, provides for clearing away of unwanted fouling material which, in the past, has served to detract from the operation by plugging or partially plugging the liquid pour-points. Adjustment of the flow through, and/or, the unfouling of, the liquid pour-tubes can be performed from a point external of the fractionator, so as not to interfere with the ongoing operation of the fractionation column. A further feature is the ability to adjust liquid flow through each individual tube to alter the distribution pattern of the liquid across the top of a packed fractionation bed.

24 Claims, 9 Drawing Figures

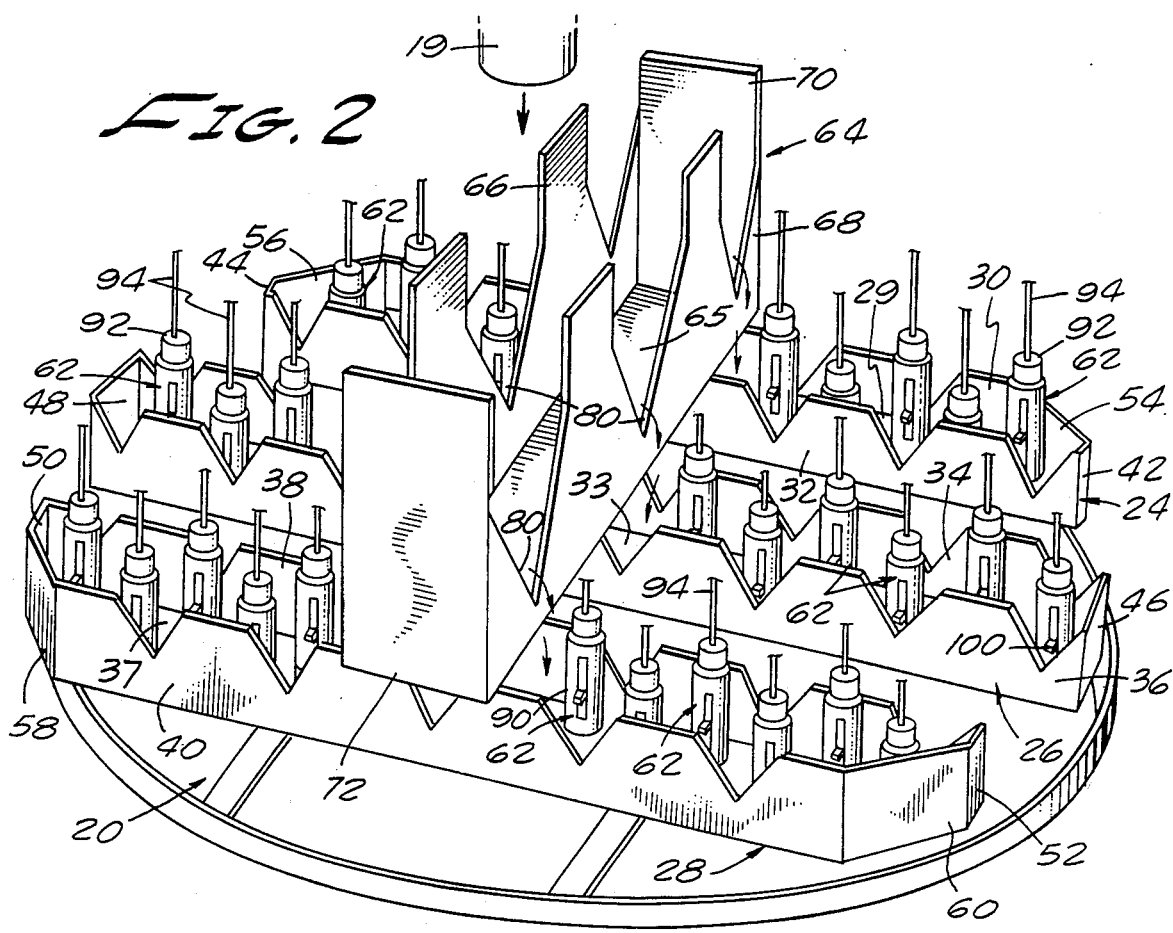

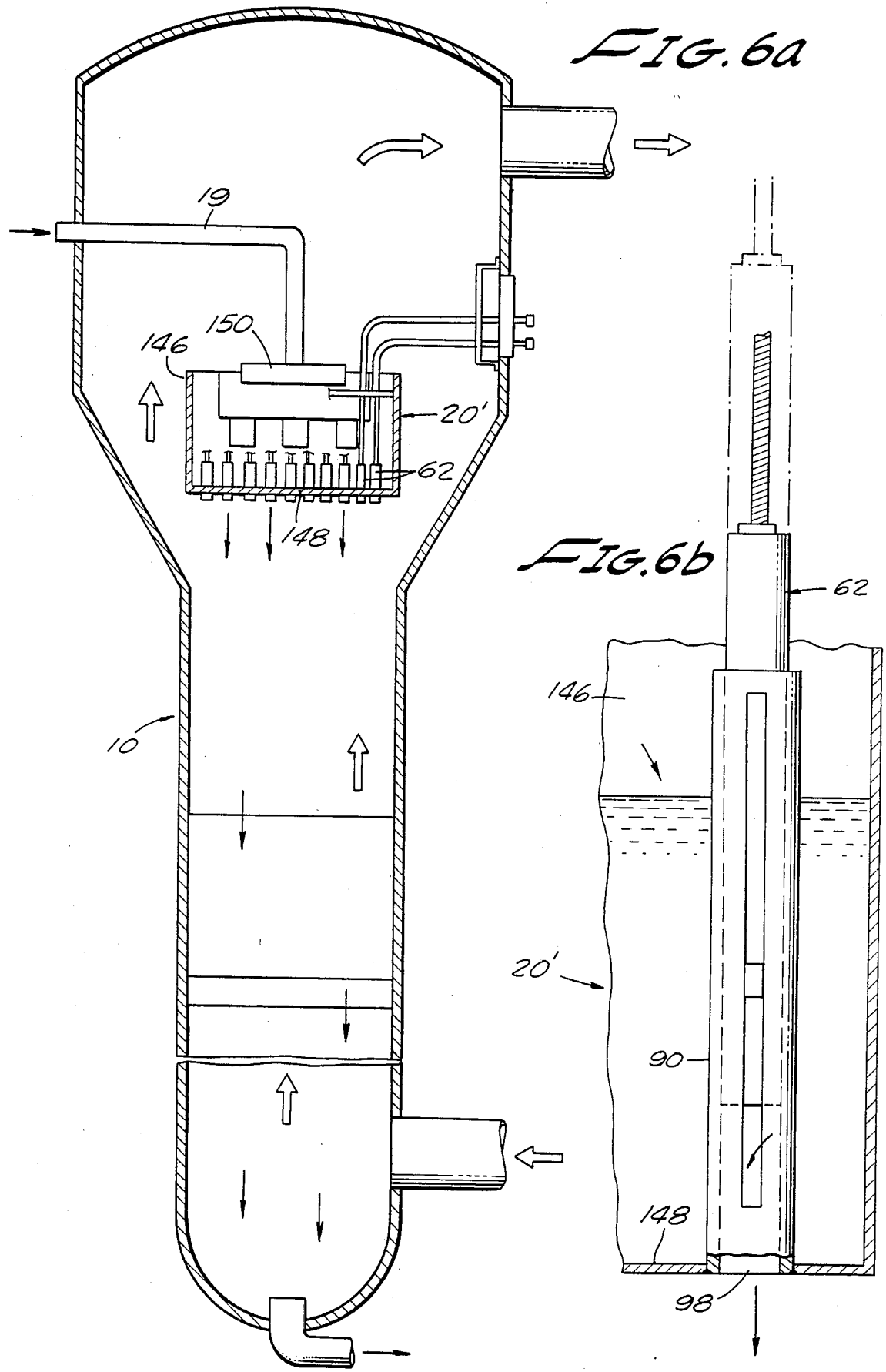

VARIABLE FLOW SELF-CLEANING LIQUID DISTRIBUTION ELEMENT AND LIQUID DISTRIBUTION ASSEMBLY EMPLOYING A PLURALITY OF SUCH ELEMENTS

FIELD OF INVENTION

The present invention relates to liquid distribution elements and liquid distribution assemblies employing such elements which are utilized, for example, in evenly distributing liquid over some surface area, for example, the top of a bed of packing in a packed fractionating column.

BACKGROUND AND SUMMARY OF THE INVENTION

The use of liquid distribution units and liquid distribution assemblies employing such units to distribute liquids over a surface area, for example, the surface of a bed of packing material in a fractionating column, is well-known in the art. As employed in the fractionating column art, these liquid distribution units are composed of various types in which the liquid entering the fractionator is distributed by means of notches, weirs, orifices, sprays, etc. Typical liquid distribution assemblies include those known in the art as a box-type, a sieve-type, a ringset-type, a straight-tube sparger-type or a shower-head type. Further, well-known in the art are spray nozzle distributors, drip-pan distributors, notched-trough distributors and drip-tube pan distributors. The purpose of such distribution assemblies used in the art is to break up the entering liquid, which enters the distributor through one or more liquid inlets, into numerous separate streams for even distribution of the liquid over some surface area. The reason for this is that, for example, in the fractionization art, the extent to which the packing bed is wetted is a major determining factor in the separating efficiency of the fractionating tower. It is well-known in the art that the initial distribution of liquid onto the surface of the packed bed is essential to the ultimate performance of the fractionating unit. The above-noted distribution assemblies used in the art are varied, depending upon the requirements of the vapor-liquid traffic in the column, the cleanliness of the liquid entering the column and the process conditions encountered, for example, temperature, corrosion, pressure, etc.

While the present invention may find utility for liquid distribution in other environments, it is particularly adapted for liquid distribution in packed column fractionation units. An example of a typical packed column fractionation unit known in the art is shown in FIG. 1. Typical fractionating columns are equipped with a packing-type device. Packing devices can be categorized into two types known in the art, random packing and structured packing. Apart from the liquid distribution assembly, the particulars of the fractionating column and specifically the particulars of the packing used, form no part of the present invention.

It is known in the art that the design of liquid distribution assemblies currently used in the art has resulted in unreliable performance due to the fact that such assemblies are subject to inaccurate streams of liquid and to plugging due to contamination and fouling of the various orifices, weirs, spray-nozzles, etc. The result of this is that the fractionating tower performance changes with time or with changes in liquid flow. At present, the art depends on accurate estimates of the rate of liquid flow for the type of distributor used, as well as the size and distribution of the orifices, weirs, tubes, etc. Taking into account known principles of hydraulics, these types of devices can be made to operate properly. However, due to changes in flow, plugging, fouling and various controls implemented during the operation of the fractionation tower, the performance of these devices will change during operation. It can be seen, that while liquid distribution elements and assemblies thereof exist in the art, such liquid distribution elements and assemblies thereof have been less than satisfactory. Recognizing the need for an improved liquid distribution element for incorporation into a liquid distribution assembly, it is a general object of the present invention to provide a liquid distribution element to regulate liquid flow for the purpose of distribution of liquid over a surface area with the capability of varying the flow through individual liquid distribution elements and, further, the capability of cleaning the elements by means operated externally of the fractionation column, without the need for shutting down the operation of the column to allow internal access for the purpose of cleaning or adjusting the liquid distribution elements. In this manner, the improved liquid distribution element and liquid distribution assembly comprising a plurality of such elements enhances the accuracy and operating life of the liquid distribution assembly, and allows for cleaning and adjustment of the individual liquid distribution elements with the fractionation process underway.

A feature of the present invention is to provide a modified pan-type liquid distribution assembly. Such pan-type liquid distribution assemblies are known in the art and employ distribution tubes. These have been designed to give a very efficient form of distribution. However, the art has been somewhat discouraged from the use of this type of distributor, even though it is of relatively simple construction, because of fouling and plugging of the liquid pour points. A feature of the present invention is to provide a means for the regulation of the flow through such distribution tubes and, at the same time, provide for a means for clearing the collection of unwanted fouling material which, in the past, has served to detract from the operation by plugging or partially plugging the liquid pour-points. Another feature of the present invention is to provide a means for performing the adjustment of the flow through, and/or, the unfouling of, the liquid pour-tubes from a point external of the fractionator, so as not to interfere with the ongoing operation of the fractionation column. A further feature of the present invention is the ability to adjust liquid flow through each individual tube to alter the distribution pattern of the liquid across the top of the packed fractionation bed to improve the operation of the fractionation column, again with the adjustment being made with the process underway from external to the fractionation column.

The above features and advantages of the present invention have been described generally in order that the more detailed description which follows may be better understood and in order that the contribution to the art may be better appreciated. These and other features of the present invention will be apparent to those of ordinary skill in the art with reference to the detailed description which follows and the accompanying drawings in which like reference numerals have been used to identify like elements.

BRIEF DESCRIPTION OF THE DRAWINGS

FIG. 2 shows the modification, according to the present invention, of a slotted-distribution trough, which utilizes the liquid distribution elements according to the present invention;

FIGS. 4A and B show the liquid distribution element of FIG. 3 during and after a cleaning stroke of the piston, whereby a tab protruding from the piston cleans the slot and the terminal end of the piston unfouls the discharge end of the liquid distribution element hollow tube;

FIGS. 6 and 6A show an alternative embodiment of the present invention in which an orifice drip-pan type liquid distribution assembly is modified according to the present invention to contain a plurality of liquid distribution elements as shown in FIGS. 3 and 4A and B.

DETAILED DESCRIPTION OF A PREFERRED EMBODIMENT

Figure 1:
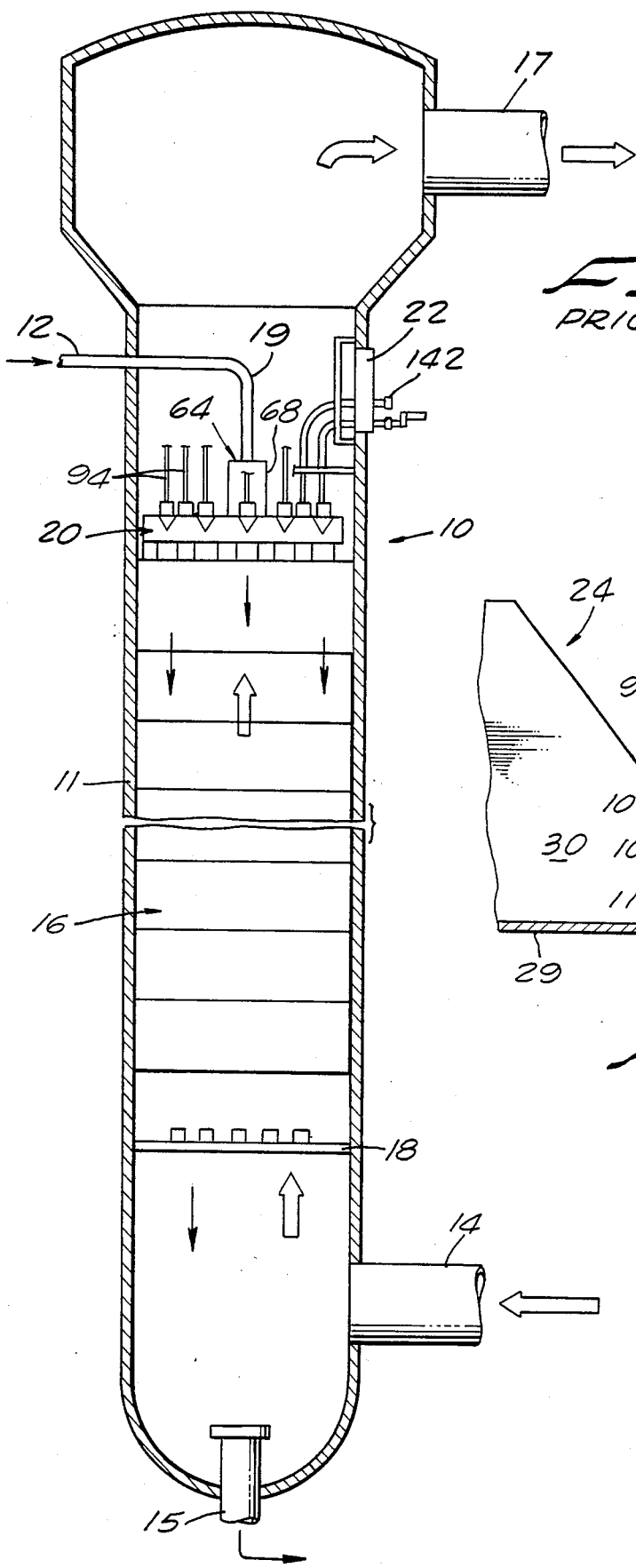
FIG. 1 shows a typical packed column fractionation unit known in the art, in which the present invention may be utilized.

Turning now to FIG. 1 a typical packed column fractionation unit 10, known in the art, is shown for purposes of illustrating a possible environment for the present invention. The fractionation unit 10 has a liquid inlet 12 at its upper end and a vapor inlet 14 in its lower end. Intermediate, the liquid inlet 12 and the vapor inlet 14 is a generally cylindrical hollow column 11 which contains a packing bed 16 having packing elements of any of a wide variety known and used in the art. The liquid exits at 15 and the vapor at 17. Above the packing bed 16, it is known in the art to apply a liquid distribution assembly 20 for the purpose of evenly distributing the liquid entering the liquid distribution assembly 20 through a liquid inlet pipe 19, over the surface of the packing bed 16. The packing bed is supported at its lower end by a support plate 18 mounted to the fractionation column 11. An access port 22 is provided for entry into the fractionation column 11, for the purposes of, for example, adjusting the liquid distribution assembly or unfouling portions of the liquid distribution assembly as necessary, which in the art must be done periodically after some time of operation of the fractionation unit 10. One possible liquid distribution assembly known in the art is a notched-trough pan, a modification of which to contain liquid distribution elements according to the present invention, is one example of a utilization of the present invention.

Turning now to FIG. 2, a notched-trough type liquid distribution assembly 20, according to the modification of the present invention, is shown. A notched-trough liquid distribution assembly 20 contains a plurality of distribution troughs 24, 26 and 28. The distribution trough 24 has a floor 29, a pair of longitudinal sidewalls 30 and 32, and a pair of lateral sidewalls 42 and 44. The distribution trough 26 has a floor 33, and a pair of longitudinal sidewalls 34 and 36, and a pair of lateral sidewalls 46 and 48. The distribution trough 28 has a floor 37, a pair of longitudinal sidewalls 38 and 40, and a pair of lateral sidewalls 50 and 52. The lateral sidewalls 42 and 44 of the trough 24 are truncated and connected to the longitudinal sidewall 30 by, respectively, angled wall 54 and angled wall 56. Similarly, the lateral sidewalls 50 and 52 of the trough 28 are truncated and connected to the sidewall 40, respectively, by angled wall 58 and angled wall 60. The angled walls 54, 56, 58 and 60 serve to facilitate the placement of the liquid distribution assembly 20 within the cylindrical interior of the fractionation column 11. Positioned crosswise of the distribution troughs 24, 26 and 28 is a cross-trough 64. The cross-trough 64 has a floor 65, a pair of longitudinal sidewalls 66 and 68, generally aligned perpendicularly to the longitudinal sidewalls, for example, 30, 32 of the distribution trough 24. The cross-trough 64 also has a pair of lateral sidewalls 70 and 72, generally aligned with the longitudinal sidewalls of the distribution troughs for example, 30, 32 of distribution trough 24. The cross-trough 64 has a plurality of liquid flow notches 80. There is one liquid flow notch 80 in each of the longitudinal sidewalls 66 and 68 of the cross-trough 64 for each of the distribution troughs 24, 26 and 28. The notches 80 are generally centered over the longitudinal center line of the respective troughs 24, 26 and 28.

Each of the troughs 24, 26 and 28 contain a plurality of liquid distribution elements 62 constructed according to the present invention as will be more fully described below.

Turning now to FIGS. 4A and 4B, a liquid distribution element 62, according to the present invention, is shown in more detail. For purposes of illustration, one of the liquid distribution elements 62 contained in a liquid distribution trough 24 has been chosen for purposes of description. The liquid distribution element 62 has a hollow cylindrical tube 90 which extends through the floor 29 of the liquid distribution trough 24. Contained within the hollow tube 90 is a piston insert 92 which is slideably mounted within the hollow tube 90 and has an outer diameter closely approximating that of the inner diameter of the hollow tube 90 such that a snug fit is obtained but one which allows movement of the piston insert 92 relative to the tube 90. The tube 90 has a longitudinally extending slot 96 disposed on the part of the tube extending above the trough floor 29. The lower end of the tube 90 is open forming a liquid discharge opening 98.

The piston 92 has a flexible drive-rod 94 attached to the upper end of the piston 92. Also attached to the piston 92 is a protruding tab 100, which is aligned with the slot 96. The tab has a pair of sidewalls 102 and 104 which abut the adjacent longitudinal walls of the slot 96. The tab also has a top wall 106 and a bottom wall 108. The tab 100 is displaced from the end 110 of the piston 92 for reasons that will be described more fully below. The length of the slot 96 is selected such that with the piston moved to the fullest extent possible in the upward direction such that the top wall 106 of the tab 100 abuts its end of the slot 96, the uncovered portion of the slot 96 below the end 110 of the piston 92, in conjunction with the width of the slot 96, will allow for a maximum desired flow which may be necessary from an individual liquid distribution element 62 according to the requirements of the particular apparatus for example, the particular fractionation unit, in which the liquid distribution assembly 20, according to the present invention, is utilized.

Turning now to FIGS. 4A and B, the liquid distribution element 62, according to the present invention, is shown with the piston 92 being moved to the fullest extent possible downwardly in the slot 96 such that the bottom wall 108 of the tab 100 abuts its end of the slot 96. In this position, the bottom end 110 of the piston 92 extends out of the discharge opening 98 of the slotted tube 90. In this manner, the sidewalls 102 and 104 will clear the longitudinal sidewalls of the slot 96 over the portion of the slot 96 which has been exposed to liquid flow during operation of the liquid distributor 20. Thus unwanted accumulations of fouling material clinging to the slot walls and building up during operation of the liquid distribution assembly 20 will be removed. Moreover, the travel of the piston 92 downwardly, e.g., from the position in FIG. 4A to that in FIG. 4B will remove both accumulations of unwanted fouling material on the interior surface of the tube 90 and at the rim of the discharge opening 98. It will be understood by those skilled in the art, that the lower end 110 of the piston 92 preferably will be moved to a position extending through the discharge opening 98 of the tube 90 sufficiently to insure the removal of all fouling material from the interior of the tube 90 and the rim of the discharge opening 98. However, it may be possible in some applications to utilize a travel of the piston 92 which merely moves the bottom end 110 to a point even with the bottom of the tube 90 at the discharge opening 98.

Figures 5A, 5B:
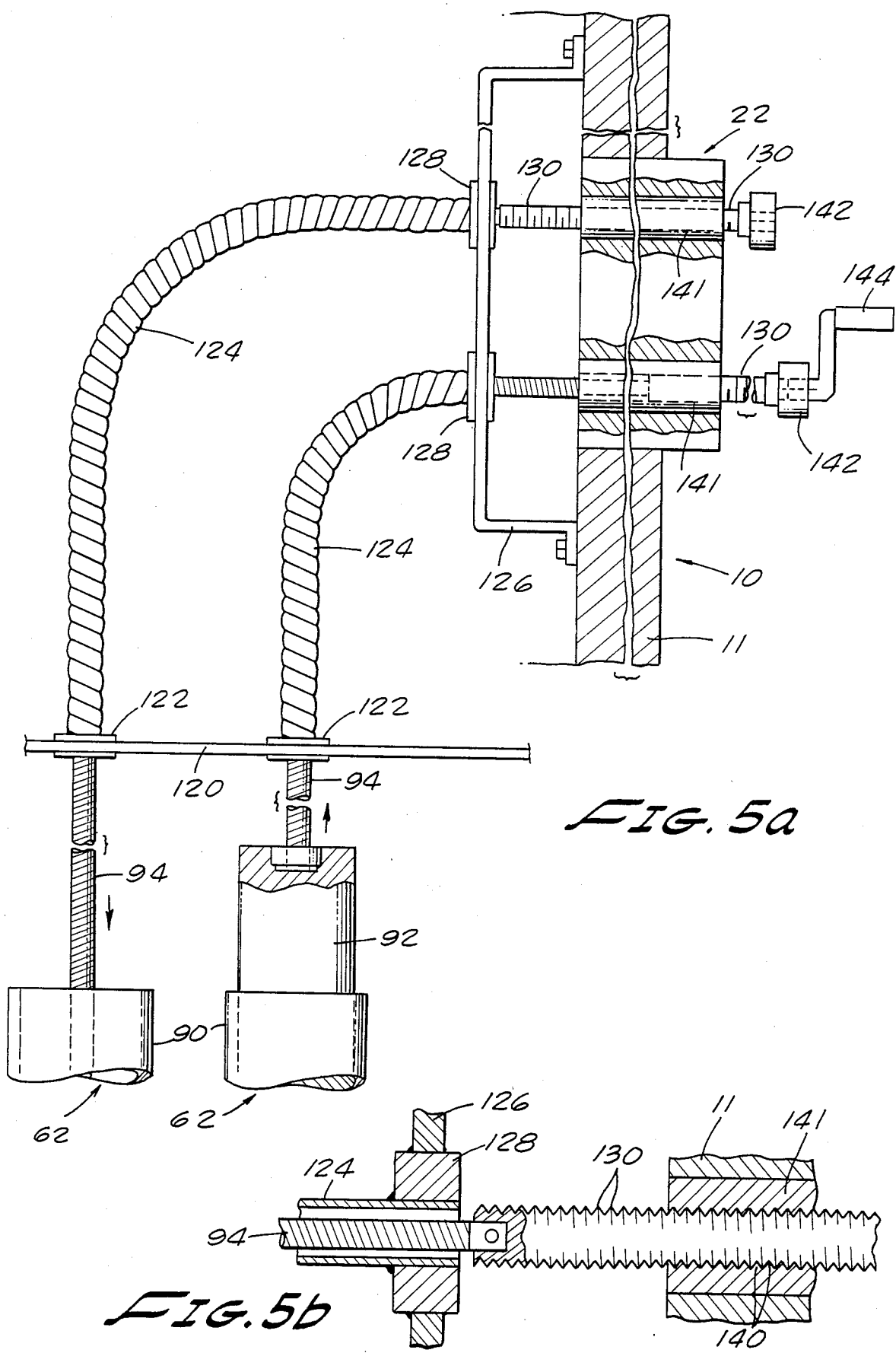
FIGS. 5A and B show a possible means for controlling the movement of the individual pistons of each of the liquid distribution element tubes, with only two such pistons and their control assemblies shown in FIG. 5A, for purposes of clarity of illustration.

Turning now to FIGS. 5A and B, a mechanism for moving the piston 92 within the tubes 90 is illustrated. Each of the flexible drive rods 94 for the respective pistons 92 passes through an aligning block 122 mounted on a bracket 120 attached to the wall 11 of the fractionation column 10. The aligning block 122 has a generally cylindrical bore through which the flexible drive rod 94 passes. Terminating in the aligning block 122 is a hollow flexible cable metal casing 124 which surrounds and protects each flexible drive rod 94 and guides the flexible drive rod 94 to an alignment block 128 mounted on an isolation box 126, which in turn is attached to the column wall 11. The flexible cables 124 also terminate in the alignment blocks 128. The terminal ends of the flexible drive rod 94 are provided with threads 130 which mate with threads 140 contained in the threaded bores 141 which penetrate the column wall 11. The end of each of the threaded portions 130 of the flexible drive rod 94 is attached to an operating knob 142. Rotation of the operating knob in one direction or the other screws the flexible drive rod 94 of the respective piston 92 inwardly or outwardly of the column wall 11. Screwing the flexible piston rod 94 inwardly of the column wall 11 results in the piston 92 moving downwardly in the hollow tube 90 and, correspondingly, screwing the flexible drive rod 94 outwardly of the column wall 11 results in the piston 92 moving upwardly in the hollow tube 90. If desired, a handle 144 may be employed to turn the respective knob 142 with the handle possibly being removable and selectively attachable to any of the drive knobs 142 by any suitable means, for example, a keyed slot (not shown) on knob 142.

Figure 3:
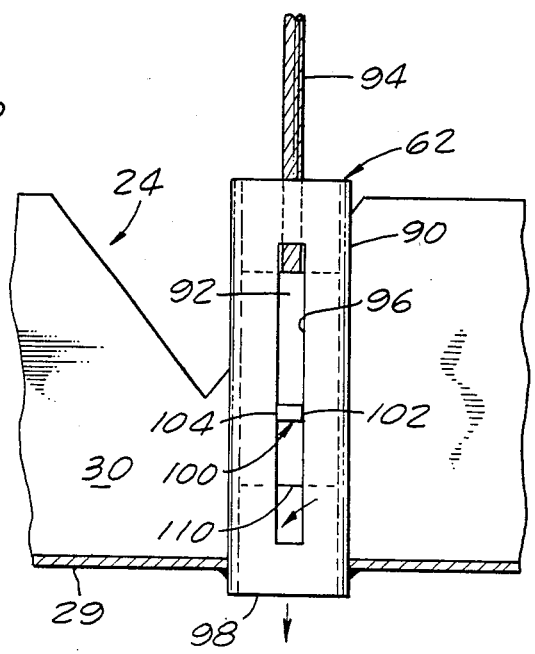
FIG. 3 shows a liquid distribution element, according to the present invention, having a piston insert positioned within the slotted hollow tube of the liquid distribution element for selecting the open area through which liquid passes through the slot in the tube, thereby regulating the amount of flow through the liquid distribution element tube.

Turning now to FIGS. 6A and B, is shown another form of liquid distribution assembly 20' in which the liquid distribution element 62, according to the present invention, may be utilized. The liquid distribution assembly 20' is of orifice plate type modified according to the present invention. Liquid distribution assembly 20' includes a generally cylindrical orifice plate housing 146 which has a floor 148 forming an orifice plate through which a plurality of openings are provided for liquid flow in a distributed manner over the packing bed of the fractionation unit 10. A liquid distribution element 62 as shown in FIGS. 3, 4A, and 4B, provided for each such opening in the plate 148. The discharge opening 98 of the hollow tube 90 of the liquid distribution element 62 may be positioned flush with the bottom of the orifice plate 148, as shown in FIG. 6B, or may extend through the plate 148 as shown in FIGS. 3, 4A and B with respect to the bottoms of the troughs 24, 26 and 28. Similarly, the discharge opening 98 illustrated with respect to the embodiment of FIGS. 2, 3, 4A and 4B, need not necessarily extend below the bottom of the respective troughs 24, 26 or 28, and may be flush therewith. Positioned above the liquid distribution element 62 of the orifice plate type liquid distribution assembly 20' is some means for distributing the liquid from the liquid inlet pipe 19 over the upper surface area of the orifice plate 148. This, by way of illustration, may be, for example, a prior art notched trough liquid distributor 150 which does not contain any liquid distribution elements 62 constructed in accordance with the present invention.

SUMMARY OF THE SCOPE AND ADVANTAGES OF THE INVENTION

It can be seen that an improved liquid distribution element according to the present invention has a number of advantages and particularly so when utilized in connection with a liquid fractionation unit. The liquid distribution elements according to the present invention are individually adjustable and cleanable without the need for access to the interior of the vessel containing the liquid distribution assembly, for example, a liquid fractionation unit, which typically would require shutdown of the unit. Optimization of the liquid distribution flow pattern, and/or adjustment for varying process parameters, as well as clearing of fouled elements, may be carried out from external to the unit with the unit still on line.

The above description of the invention and its advantages has been given by way of explanation and illustration of a preferred embodiment. It will be understood by those skilled in the art that many changes and modifications to the present invention may be made without departing from the scope and intent of the invention. For example, the tubes need not be cylindrical, i.e., they may be other than circular in cross-section, provided the piston inserts are similarly modified in cross-section so as to perform the dual functions of regulating the slot opening and cleaning the interior surface of the tube. A plurality of slots may be provided, with corresponding additional tabs on the piston insert. The tubes may extend only to flush with the bottom of the floor of the trough or plate on which they are mounted or may extend only to the top surface of the floor of the trough or plate, with an opening in the plate or trough bottom forming the discharge opening. Other means may be employed for controlling the upward and downward motion of the pistons from outside the vessel, e.g., the fractionator. These might be, e.g., a hydraulically or pneumatically controlled piston connected to the drive rod of the respective liquid distribution element piston inserts. These and other changes modifications within the skill of the art will be appreciated to come within the scope of the claims, and the appended claims are intended to cover all such changes and modifications.

What is claimed is:

1. In an apparatus for regulated distribution of a liquid, the improvement comprising:

a plurality of hollow flow tubes, each tube having a slot aligned with its longitudinal axis;

an insert slideably mounted within each tube having an outer surface which snuggly engages the inner surface of the tube;

a protuberance extending from the outer surface of the insert and having a pair of side walls, a top wall and a bottom wall, with the side walls aligned with the longitudinal dimension of the slot and snugly engaging the longitudinal sides of the slot;

the protuberance being spaced from one end of the insert such that the distance between the bottom wall of the protuberance and the one end of the insert is sufficient such that with the bottom wall of the protuberance abutting its end of the slot, the one end of the insert reaches to a position at least even with the corresponding end of the tube, sufficient to clear accumulated unwanted fouling matter from the tube when no liquid flows through the slot.

2. The apparatus of claim 1, further comprising:

the slot is of a sufficient length and the distance between the top wall of the protuberance and the one end of the insert is such that as the insert is slid within the tube in a direction away from the end of the tube corresponding to the one end of the insert, the one end of the insert will clear the slot, prior to the top wall of the protuberance abutting its end of the slot, forming an opening into the tube through a portion of the slot so that the liquid can flow through the slot.

3. The apparatus of claim 2 further comprising:

at least one generally horizontal plate;

each of the plurality of tubes being mounted on one of the at least one generally horizontal plates with its slot on one side of the plate and the end of the tube, corresponding to the one end of the insert, forming, itself or in conjunction with an opening in the plate, a discharge opening which is at least flush with the other side of the plate.

4. The apparatus of claim 3 further comprising:

the at least one generally horizontal plate is a plurality of plates, each forming the floor of one of a plurality of liquid distribution troughs.

5. The apparatus of claim 4 further comprising:

at least one liquid inlet;

means for distributing the liquid from each of the at least one liquid inlets to the liquid distribution troughs.

6. The apparatus of claim 3 further comprising:

the at least one generally horizontal plate is a single plate;

at least one liquid inlet contained in the apparatus and positioned on the same side of the single plate as the slots in the tubes.

7. The apparatus of claim 6 further comprising:

means for distributing liquid from each of the at least one liquid inlets over the surface area of the single plate.

8. In an apparatus having a bed of material over which is to be distributed, in a regulated manner, a liquid entering the apparatus from one or more liquid inlets, the improvement comprising:

a plurality of hollow flow tubes, each tube extending vertically above one of at least one generally horizontal plates positioned between the at least one liquid inlet and the bed, and each tube having a slot aligned with its longitudinal axis;

an insert slideably mounted within each tube having an outer surface which snugly engages the inner surface of the tube;

a protuberance extending from the outer surface of the insert having a pair of side walls aligned with the longitudinal dimension of the slot and snugly engaging the longitudinal sides of the slot, a bottom wall facing the bed and a top wall opposite the bottom wall;

the protuberance being spaced from one end of the insert facing the bed such that the distance between the bottom wall of the protuberance and the one end of the insert is sufficient such that, with the bottom wall of the protuberance abutting its end of the slot, the one end of the insert reaches a position at least even with the end of the tube facing the bed, sufficent to clear accumulated unwanted fouling matter from the tube when no liquid flows through the slot.

9. The apparatus of claim 8 further comprising:

the slot is of sufficient length and the distance from the top wall of the protuberance to the one end of the insert is such that as the insert is slid within the tube in a direction away from the bed, the one end of the insert will clear the slot, prior to the top wall abutting its end of the slot, forming an opening into the tube through a portion of the slot so that the liquid can flow through the slot.

10. The apparatus of claim 9, further comprising:

at least one generally horizontal plate intermediate the at least one liquid inlet and the bed;

each of the plurality of tubes being mounted on one of the at least one generally horizontal plates with its slot being on the liquid inlet side and the end of the tube facing the bed forming, itself or in conjunction with an opening in the plate, a discharge opening at least flush with the bed side of the plate.

11. The apparatus of claim 10 further comprising:

the at least one generally horizontal plate is a plurality of plates each forming the floor of one of a plurality of liquid distribution troughs.

12. The apparatus of claim 11 further comprising:

means for distributing liquid from each of the at least one liquid inlets to the liquid distribution troughs.

13. The apparatus of claim 10 further comprising:

the at least one generally horizontal plate is a single plate.

14. The apparatus of claim 13 further comprising:

means for distributing liquid from each of the at least one liquid inlets over the surface area of the single plate.

15. In a fractionating unit having a bed of packing material and a liquid distribution system for distributing and regulating the flow to the bed of a liquid entering the unit through at least one liquid inlet, the improvement comprising:

a plurality of hollow flow tubes, each tube extending vertically over the bed above one of at least one generally horizontal plates positioned intermediate the liquid inlet and the bed, with each tube having a slot aligned with its longitudinal axis;

an insert slideably mounted within each tube having an outer surface which snugly engages the inner surface of the tube;

a protuberance on the outer surface of the insert having a pair of side walls aligned with the longitudinal sides of the slot and snugly engaging the longitudinal sides of the slot, a bottom wall facing the bed and a top wall opposite the bottom wall;

the protuberance being spaced from the end of one insert facing the bed such that the distance between the bottom wall and the one end of the insert is sufficient such that with the bottom wall abutting its end of the slot, the one end of the insert reaches a position, at least even with the end of the tube, sufficient to clear accumulated unwanted fouling matter from the tube when no liquid flows through the slot.

16. The apparatus of claim 15 further comprising:
the slot is of a sufficient length and the distance from the top wall to the one end of the insert is such that as the insert is slid within the tube in a direction away from the bed, the one end of the insert will clear the slot, prior to the top wall abutting its end of the slot, forming an opening into the tube through a portion of the slot so that the liquid can flow through the slot.

17. The apparatus of claim 16 further comprising:
at least one generally horizontal plate intermediate the at least one liquid inlet and the bed;
each of the plurality of tubes being mounted on one of the at least one generally horizontal plates with its slot being on the liquid inlet side and the end of the tube facing the bed forming, itself or in conjunction with an opening in the plate, a discharge opening at least flush with the bed side of the plate.

18. The apparatus of claim 17 further comprising:
the at least one generally horizontal plate is a plurality of plates, each forming the floor of one of a plurality of liquid distribution troughs.

19. The apparatus of claim 18 further comprising:
means for distributing liquid from each of the at least one liquid inlets to the liquid distribution troughs.

20. The apparatus of claim 19 further comprising:
the means for distributing liquid comprises an upper trough intermediate the liquid inlet and the distribution troughs and aligned crosswise to the distribution troughs with the upper trough having a pair of longitudinal side walls each having a plurality of slots corresponding in number to the number of distribution troughs and positioned to deposit liquid flowing from each slot into a respective one of the distribution troughs.

21. The apparatus of claim 18 further comprising:
the at least one generally horizontal plate is a single plate.

22. The apparatus of claim 21 further comprising:
means for distributing liquid from each of the at least one liquid inlets over the surface area of the single plate.

23. The apparatus of claim 22 further comprising:
the single plate forms the floor of a liquid distribution element positioned within the fractionating unit intermediate the liquid inlet and the bed, and centered above the bed;
means for distributing the liquid over the surface area of the single plate comprising a notched trough distribution mechanism.

24. The apparatus of claim 23 further comprising:
the notched trough distribution mechanism comprises:
a plurality of distribution troughs each having notched longitudinal side walls;
a crosswise trough disposed above the distribution troughs having a pair of longitudinal side walls aligned generally across the distribution troughs each having a plurality of notches corresponding in number and location to discharge liquid into a respective one of the distribution troughs.

* * * * *

Dedication 4,569,364.—*George J. Keller, Laguna Miguel* and *Takashi Yanagi,* Monterey Park, Calif. VARIABLE FLOW SELF-CLEANING LIQUID DISTRIBUTION ELEMENT AND LIQUID DISTRIBUTION ASSEMBLY EMPLOYING A PLURALITY OF SUCH ELEMENTS. Patent dated Feb. 11, 1986. Dedication filed May 5, 1986, by the assignee, *Fractionation Research, Inc.*

Hereby dedicates to the Public the entire remaining term of said patent.
[*Official Gazette August 5, 1986.*]